United States Patent
Krohn et al.

(10) Patent No.: US 10,389,402 B1
(45) Date of Patent: Aug. 20, 2019

(54) BACKGROUND NOISE FLOOR THRESHOLDS FOR FREQUENCY HOPPING SYSTEMS

(71) Applicant: Amazon Technologies, Inc., Seattle, WA (US)

(72) Inventors: Justin Joel Krohn, Renton, WA (US); Ronald Eugene Huebner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/718,626

(22) Filed: Sep. 28, 2017

(51) Int. Cl.
*H04B 1/713* (2011.01)
*H04B 1/715* (2011.01)

(52) U.S. Cl.
CPC ..... *H04B 1/715* (2013.01); *H04B 2001/7154* (2013.01); *H04B 2201/71315* (2013.01); *H04B 2201/71376* (2013.01)

(58) Field of Classification Search
CPC ...... H04B 1/715; H04B 1/713; H04B 1/7156; H04B 2001/7151
See application file for complete search history.

(56) References Cited

U.S. PATENT DOCUMENTS

| | | | | |
|---|---|---|---|---|
| 6,052,406 A | * | 4/2000 | Epstein | H04B 1/7156 375/130 |
| 2002/0080739 A1 | * | 6/2002 | Kuwahara | H04B 1/715 370/333 |
| 2006/0013172 A1 | * | 1/2006 | Ruuska | H04B 1/7143 370/338 |
| 2017/0317870 A1 | * | 11/2017 | Soto | H04B 1/7156 |

* cited by examiner

Primary Examiner — Syed Haider
(74) Attorney, Agent, or Firm — Lee & Hayes, P.C.

(57) ABSTRACT

A frequency hopping communication system uses measured intensity values, such as RSSI (received signal strength indication) values, of RF signals previously received on a particular channel to generate a signal threshold that is tailored for the particular channel and is to be applied to subsequent frequency hopping processes. The signal threshold is used for determining whether a received RF signal is from an actual transmission or is merely background noise.

20 Claims, 6 Drawing Sheets

BACKGROUND NOISE FLOOR THRESHOLDS FOR FREQUENCY HOPPING SYSTEMS

BACKGROUND

Frequency hopping (channel hopping) may be used in radio frequency (RF) communications to mitigate interference and to increase reliability. Additionally, regulations may require use of such spread spectrum techniques in some conditions. Some disadvantages arise, however, because of the relative closeness in frequency of neighboring channels. For example, frequency hopping among such close channels may be complicated by a difficulty in distinguishing the neighboring channels from one another and in distinguishing actual signals on the channels from background noise.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Frequency hopping is a method of receiving radio signals by switching a carrier signal among multiple frequencies or channels, thereby receiving signals over a spread spectrum. Frequency hopping allows for rejecting signal interferences that may be present in any portion of a radio frequency (RF) spectrum. Frequency hopping may also be useful for preventing continuous occupation of a particular frequency. Frequency hopping may be utilized in many different types of networks, including communication networks, control systems, and advance metering infrastructures (AMI) (e.g., utility metering), just to name a few examples.

In some situations, an RF receiver may utilize an increase in RF background noise to indicate that an RF signal is being received. This is based on the idea that an RF signal from a transmitter should be above the background noise to be able to be received without error. Unfortunately, such a technique for determining whether a received RF signal is actually a transmitted signal or merely background noise may be difficult for frequency hopping communications. Here, communication frequencies (e.g., channels) may be close enough to one another that RF signals on these channels can be detected even if the RF receiver is not locked onto the channel having the RF signal. In other words, a receiver locked onto a first channel may detect an RF signal on a second channel.

In various embodiments described herein, RSSI (received signal strength indication) values of RF signals previously received on a particular frequency may be used to generate a signal threshold that is tailored for the particular frequency. A signal threshold is generally used in a process of determining whether a received RF signal is from an actual transmission or is merely background noise. For example, if the strength or magnitude of a received RF signal is greater than a signal threshold, then an RF receiver may consider the received RF signal to be from an actual transmission and the RF receiver may consequently lock onto the channel of a frequency associated with the received RF signal. On the other hand, if the strength or magnitude of the received RF signal is less than a signal threshold, then the RF receiver may consider the received RF signal to be noise (e.g., background noise) and the RF receiver may consequently ignore the received RF signal (e.g., not lock onto the channel of a frequency associated with the received RF signal).

Accordingly, tailoring signal thresholds for particular channels may allow for improved determination of the presence of actual RF signals and not background noise.

Figure 1:
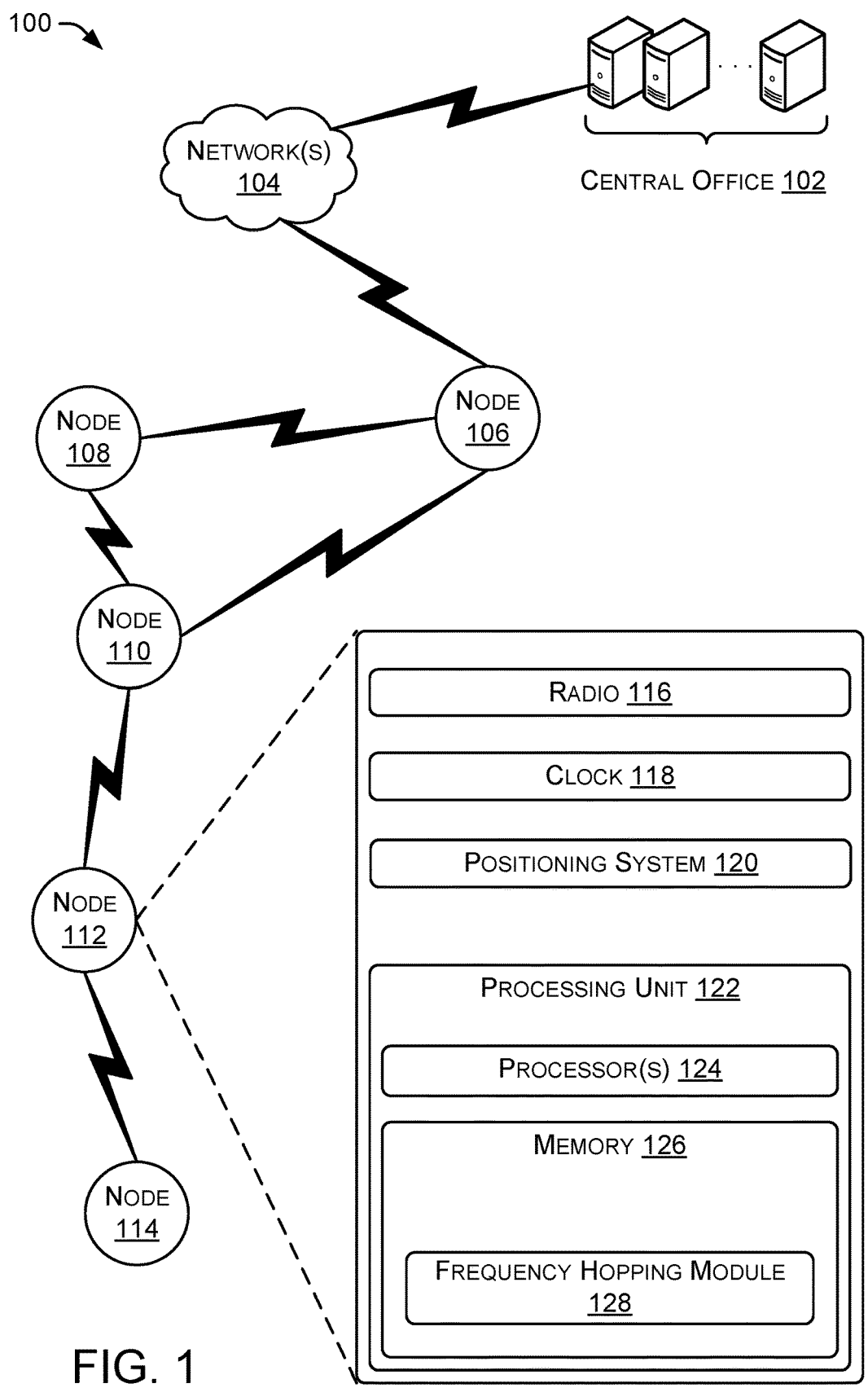
FIG. 1 is a block diagram illustrating an example network, and showing detail of a node configured for frequency hopping.

FIG. 1 is a block diagram showing an example network 100, which may be configured as a communications network, a control system network, a smart grid or advanced metering infrastructure (AMI) of a utility network, etc. Central office(s) 102 may communicate with one or more networks 104, which may include the Internet, cellular network, etc. A plurality of nodes 106-114 may be associated with electrical meters, transformers, water meters, gas meters, radio-operated craft, or other devices on any type of network or AMI. The nodes may communicate with one another using RF communication, and may be configured as a mesh network in which messages are passed from node to node, a star network with a central hub, or a combination or hybrid network, for instance.

An example node 112 may include a radio 116, which may be configured to transmit and/or receive RF signals. In the example shown, the radio 116 is a transceiver, configured to communicate with nodes both upstream (toward a root node or edge device) and downstream (toward a child or leaf node), including transmission of packets to/from nodes 110 and 114. Radio 116 may be configured for frequency hopping over a spread spectrum of channels.

A clock 118 provides time-of-day and/or time-measurement to various devices on node 112, and may provide information to radio 116 to support channel hopping. A positioning system 120, such as a global positioning system (GPS) and/or accelerometer, may allow for measuring or detecting position and/or velocity of node 112 relative to any of a number of moving or static objects, including the other nodes 106-114 or various transmitting entities, such as a radio-operated craft.

A processing unit 122 may include one or more processors 124 and memory 126. In other examples, the processing unit 122 may be implemented as one or more other hardware circuits (e.g., an ASIC, an FPGA, etc.).

A frequency hopping module 128 may be located in memory 126 and executed by the processing unit 122. Alternatively, frequency hopping module 128 may be configured as a dedicated hardware or hybrid hardware/software device. In one example, frequency hopping module 128 is configured to generate a signal threshold by utilizing an RF signal received on a channel. Here, the signal may have a measurable RSSI value. Frequency hopping module 128 may generate a signal threshold for the channel based, at least in part, on the RSSI value. Frequency hopping module 128 may subsequently determine, based at least in part on the signal threshold, whether to lock onto the channel during subsequent frequency hop operations. Frequency hopping module 128 may also modify the signal threshold based, at least in part, on (i) time elapsed since receiving the signal, or (ii) on location or velocity, relative to the node, of a transmitter that transmitted the signal, as described in detail below.

In some embodiments, frequency hopping module 128 may be operable by the processing unit to generate a signal threshold by (i) receiving a signal on a first channel, the signal having a received signal strength indication (RSSI) value, (ii) generating the signal threshold for the first channel based, at least in part, on the RSSI value, and (iii) determine whether to lock onto the first channel during subsequent frequency hop operations, the determining based, at least in part, on the first signal threshold. In some embodiments, frequency hopping module 128 is configured to modify the signal threshold based, at least in part, on time elapsed since receiving the signal. In some embodiments, frequency hopping module 128 is configured to modify the signal threshold based, at least in part, on location or velocity, relative to node 112, of a transmitter that transmitted the signal. In some embodiments, node 112 is configured to generate a second signal threshold by (i) receiving a second signal on a second channel, the second signal having a second RSSI value, (ii) generating a second signal threshold for the second channel based, at least in part, on the second RSSI value; and (iii) determining whether to lock onto the second channel during the subsequent frequency hop operations, the determining based, at least in part, on the second signal threshold.

In some embodiments, frequency hopping module 128 is further configured to modify the original signal threshold using a first set of parameters, and modify the second signal threshold using a second set of parameters, wherein the first set of parameters is different from the second set of parameters. Thus, different signal thresholds associated with different channels may be modified independently of one another. In some examples, the first set of parameters includes a quality indicator of the first signal. Such indicators may include an averaged received signal strength measured over relatively long time spans (e.g., seconds, minutes, or longer), which may indicate consistency of the signal, and deviation from such an average (e.g., mean signal strength), just to name a few examples.

While FIG. 1 illustrates a few example components, node 112 may have additional features or functionality. For example, the node 112 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within node 112 may reside remotely from node 112 in some implementations. In these implementations, the node 112 may utilize various communication interfaces (e.g., in addition to radio 116) to communicate with and utilize this functionality.

Figure 2:
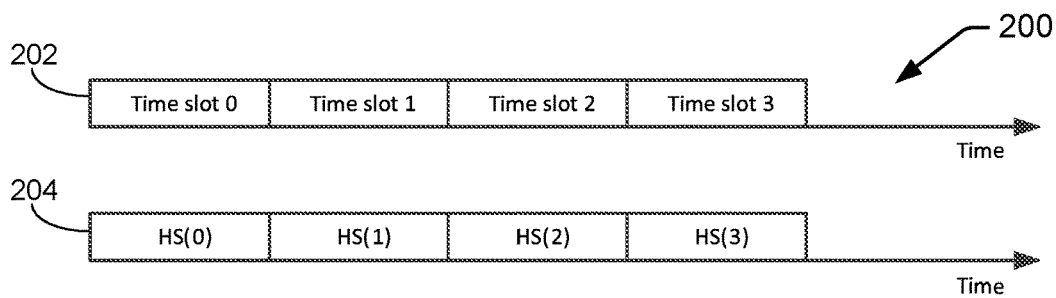
FIG. 2 is a diagram illustrating a relationship between timeslots and a hopping sequence.

FIG. 2 is a diagram showing an example relationship 200 between timeslots 202 and hopping sequences 204. In the example, each timeslot is associated with a hopping sequence channel. Thus, at any given time, a particular frequency is in use by a transmitter and receiver. Upon conclusion of the timeslot, the transmitter and receiver may move to a different frequency and/or channel associated with the next timeslot.

Frequency hopping is a spread spectrum technique that may be used when a band (i.e., a portion of the RF spectrum) is to be shared between several users. Frequency hopping may be used to mitigate link impairments (i.e., reception problems between network nodes) due to interference and also to minimize interference caused by the network nodes to other users of the band. A network (e.g., network 100 of FIG. 1) may use, for example, a frequency band of finite extent (e.g., the 902 MHz-928 MHz ISM band). The band utilized by the network may be subdivided into channels (e.g., 64 channels (IEEE 802.15.4g OFDM Option 3)). In one example, the network utilizes frequency hopping by using available channels (or a significant subset of them) in a sequence, called the hopping sequence. By frequency hopping, the RF traffic is spread over the band.

The frequency hopping sequence may have certain characteristics, or may be configured to conform to certain requirements. The hopping sequence describes a sequence by which the channels in a channel plan may be utilized. The channel plan may include the center frequencies and occupied bandwidths of a plurality of channels that are available for use. The channel plan and hopping sequence may be associated with a modulation scheme. In one example, the hopping sequence may be configured to use all channels equally (or nearly equally). Also, so that communication is successful and synchronized, both the transmitter and the receiver should know the hopping sequence and the modulation scheme. The hopping sequence may be described by notation (e.g., HS(k), wherein HS is a particular hopping sequence, k is a particular timeslot, and HS(k) is a particular channel at the particular timeslot). Interference is mitigated if the sequence is random, pseudo random, or nearly so. For example, hopping only between adjacent channels may not be effective to avoid interference from wide-band interferers.

In the example of FIG. 2, a time period (e.g., 24 hours) may be divided into periods called "timeslots" or "time slots" which may be of equal length. Timeslots zero through three are shown in FIG. 2. A hopping sequence may be associated with the timeslots. The hopping sequence associates a channel or RF frequency with each timeslot. In the example of FIG. 2, the sequence (HS(0), HS(1), HS(2), . . . ), where HS(k) represents a channel number or frequency, is the hopping sequence. Accordingly, each timeslot is mapped to an element of the hopping sequence. During timeslot number k, the receiver is listening on channel number HS(k). If the transmitter wants to send a data packet during timeslot number k, it will send it on channel number HS(k), and a receiver (being locked onto the channel) will receive it on that channel.

Thus, FIG. 2 shows an example by which a single hopping sequence may be associated with a given set of channels.

However, the techniques disclosed herein perform additional functionality. In one example, different networks may be associated with different radio bands (i.e., RF spectrum of different widths and frequencies). Techniques described herein may be used to adapt the hopping sequence to any number of channels and may involve generating respective signal thresholds for each of the channels. Accordingly, frequency hopping module 128 of FIG. 1 may operate for differing availability of RF spectrum, different channel locations, and/or different numbers and lengths of timeslots. Accordingly, frequency hopping module 128 may configure a node for use in a system or network having different available spectrum and design requirements.

Figure 3:
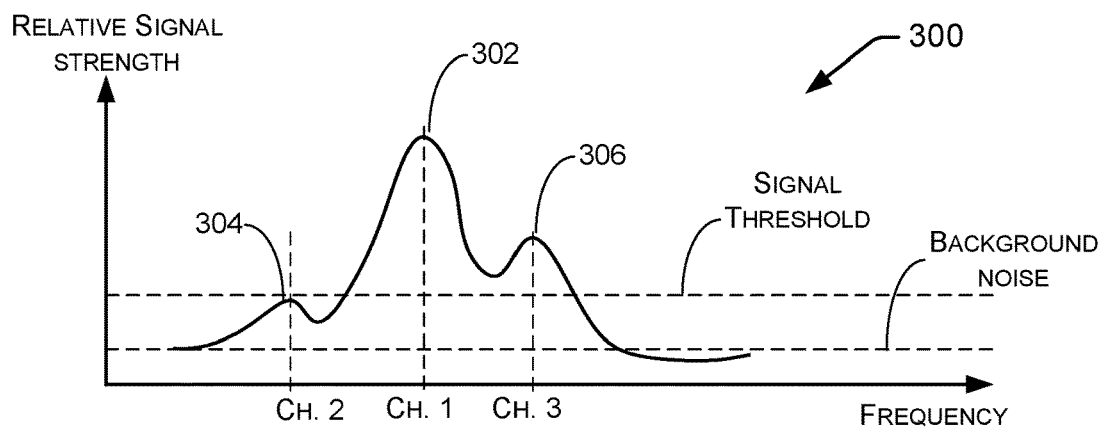
FIG. 3 illustrates an example frequency spectrum that includes several channels.

FIG. 3 illustrates an example RF signal distribution 300 at a particular time. Distribution 300 includes several channels that are relatively close to one another. For example, channel frequencies may be several GHz (gigahertz) and separated from one another by about several MHz (megahertz). In some embodiments, such an RF signal distribution may be received at an RF receiver, which may be a node such as node 112. In the illustrated example, a dominant peak 302 is an RF signal for channel 1. Smaller neighboring peaks 304 and 306 are RF signals for channels 2 and 3, respectively. For a numerical example, channel 1 may have a peak frequency at 2.450 GHz, channel 2 may have a peak frequency at 2.445 GHz, and channel 3 may have a peak frequency at 2.455 GHz, though claimed subject matter is not so limited. RF signals of the three illustrated channels rise above the background noise, which is ever-present and results from various environmental sources. The RF signals of the three illustrated channels are also greater than a signal threshold, which may be predetermined in the design or operation of the receiver. In some cases, whether an RF signal of a channel is greater or less than a signal threshold may determine, at least in part, if the receiver proceeds to lock on to the channel or ignore the RF signal. In some embodiments, the signal threshold is set substantially higher than the expected background noise so that spurious or other types of "false signals" that rise a little above the background noise can be ignored. For example, the intensity of peak 302 of channel 1 may be about −20 dB, background noise intensity may be about −100 dB, and the signal threshold level may be set at about −70 dB.

Generally, a frequency hopping receiver jumps cyclically among channels so that an RF signal of an individual channel is detected and received during a relatively short time span. For example, referring to the nomenclature of FIG. 2, a particular channel may have a particular time slot in the sequence (HS(0), HS(1), HS(2), . . . ). In the case for FIG. 3, a frequency hopping receiver may jump cyclically from channel to channel among channels 1, 2, and 3. Though three channels are described and illustrated in FIG. 3, any number of channels may be present and claimed subject matter is not limited in this respect.

Figure 4:
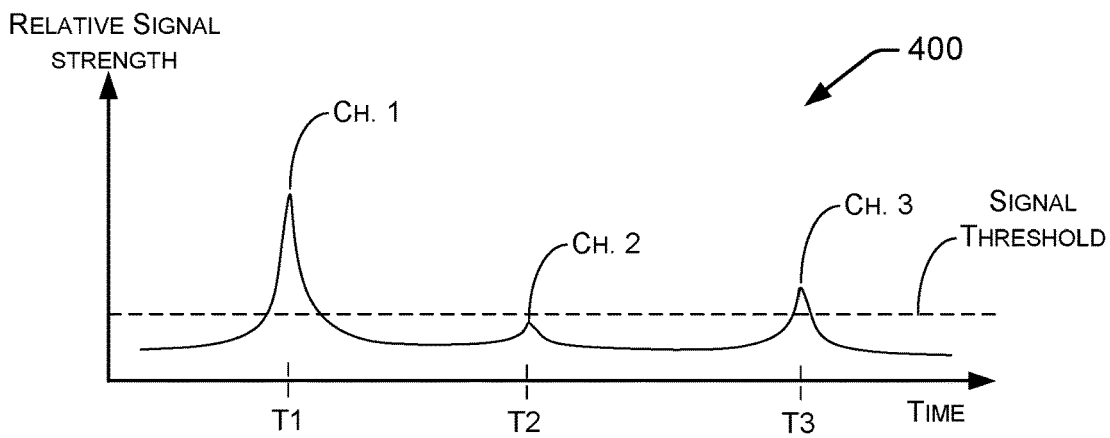
FIG. 4 illustrates an example scan over time across signals of three channels.

FIG. 4 illustrates an example RF scan 400 over time across RF signals transmitted by an RF transmitter on three channels. For instance, an RF receiver may scan across a spectrum (e.g., 300 illustrated in FIG. 3) and sequentially hop among individual channels. In the illustrated example, the RF receiver intercepts and receives an RF signal (e.g., which may be measured by its RSSI value) of channel 1 at time T1, frequency hops to channel 2 at time T2, and then hops to channel 3 at time T3. Note that an RF receiver may frequency hop in any sequence, which need not be in order of increasing frequency or channel number. The relatively strong RF signal of channel 1 may be an actual signal whereas the weaker signals of channels 2 and 3 may be noise. In such a case, the RF signal of channel 1 may be data packets transmitted on channel 1 by an external entity (e.g., a node) and that are to be communicated to the RF receiver. To perform such communication, the RF receiver may lock onto channel 1. After receiving the data packets on channel 1, the RF receiver may frequency hop to channel 2. Here, the RF receiver may determine whether to lock onto channel 2 or whether to ignore the RF signal of channel 2 and hop to subsequent channel 3.

In some embodiments, the criterion for determining whether to lock onto a channel is whether the RF signal associated with the channel has a magnitude greater than that of a predetermined signal threshold. In the case illustrated in FIG. 4, the RF signal for channel 1 is above the signal threshold. Thus, the RF receiver may lock onto channel 1. The RF signal for channel 2, however, is below the signal threshold. Thus, the RF receiver may ignore channel 2 and frequency hop to channel 3. The RF receiver may determine whether to lock onto channel 3 or whether to ignore the RF signal of channel 3 and hop to subsequent channel (not illustrated). Again, the criterion for determining whether to lock onto channel 3 is whether the RF signal associated with channel 3 has a magnitude greater than that of the signal threshold. In this particular situation, it does. Thus, the RF receiver may lock onto channel 3. This may present a problem if the RF signal on channel 3 is principally noise. Preferably, the RF receiver would lock onto channel 1 to receive the associated data packets and not lock onto any other channel such as channel 3, which has no data packets (being mostly, if not all, noise). Thus, the criterion based on comparing a received RF signal with a predetermined signal threshold did not work well in this example situation.

Figure 5:
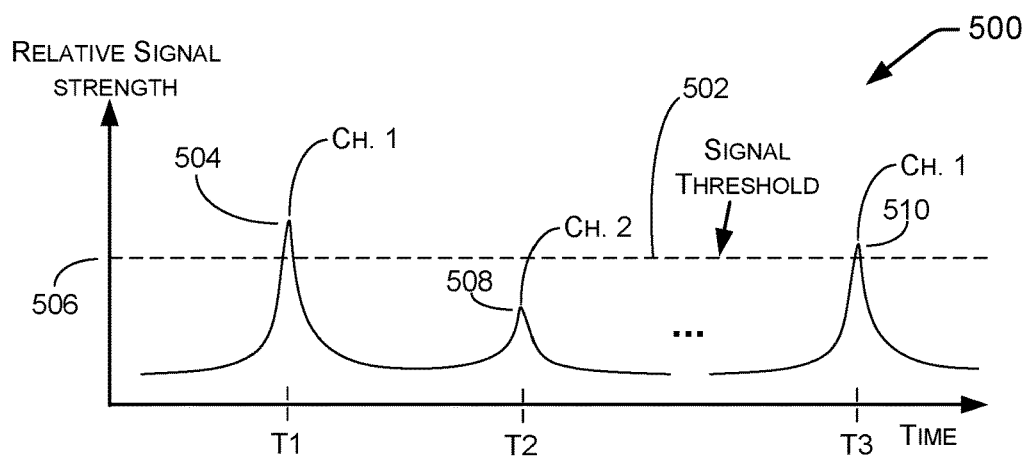
FIG. 5 illustrates an example scan over time across signals of two channels that are compared to a signal threshold that is associated with one of the channels.

FIG. 5 illustrates an example RF scan 500 over time across RF signals transmitted by an RF transmitter on two channels. For instance, an RF receiver may scan across a spectrum and sequentially hop among individual channels. In the illustrated example, the RF receiver intercepts and receives an RF signal of channel 1 at time T1, frequency hops to channel 2 at time T2, and then hops to other channels (not illustrated). At some time, the RF receiver may cyclically return to channel 1 via a frequency hop at time T3. This illustrated example is similar to that of FIG. 4 except that (among other things) signal threshold 502 in scan 500 is not necessarily predetermined but is instead generated based, at least in part, on the RF signal of channel 1, as described below.

The relatively strong RF signal of channel 1 may be an actual signal whereas the weaker signal of channel 2 may be noise. In such a case, the RF signal of channel 1 may be data packets transmitted on channel 1 by an external entity (e.g., a node) and that are to be communicated to the RF receiver. To perform such communication, the RF receiver may lock onto channel 1. After receiving the data packets on channel 1, the RF receiver may frequency hop to channel 2. Here, the RF receiver may determine whether to lock onto channel 2 or whether to ignore the RF signal of channel 2 and hop to a subsequent channel (not illustrated). As mentioned above, the criterion for determining whether to lock onto a channel is whether the RF signal associated with the channel has a magnitude greater than that of signal threshold 502. In the case illustrated in FIG. 5, the RF signal for channel 1 is above the signal threshold. Thus, the RF receiver may lock onto channel 1. The RF signal for channel 2, however, is below signal threshold 502. Accordingly, the RF receiver may ignore channel 2 and frequency hop to a subsequent channel. Thus, the RF receiver has locked onto channel 1 to receive a first set of data packets on channel 1 and has not locked onto channel 2, which has no data packets (being mostly, if not all, noise). Thus, the criterion based on comparing a received RF signal with a signal threshold that is generated based on the RF signal works well in this example situation.

At time T3, the RF receiver will again cyclically frequency hop to channel 1. The RF signal of channel 1 at time T3, in the illustrated example, is less than that of the RF signal of channel 1 at time T1. Such a change in magnitude (e.g., weaker signal) may be due to an increased distance between the RF transmitter and the RF receiver, for example. Because the RF signal is greater than signal threshold 502, the RF receiver may lock onto channel 1 to receive a second set of data packets.

The process described above for scan 500 may be performed by an entity such as node 112, for example. In such a case, frequency hopping module 128 may frequency hop to channel 1, which has a first transmission signal having a first signal strength 504. Frequency hopping module 128 may measure first signal strength 504. Subsequently, processing unit 122 may generate a value 506 for signal threshold 502 based, at least in part, on first signal strength 504.

Frequency hopping module 128 may frequency hop away from channel 1 to channel 2 and determine whether to lock onto a second transmission signal on channel 2. Such determining may be based, at least in part, on whether second signal strength 508 is greater than signal threshold value 506. In the illustrated case, second signal strength 508 is less than signal threshold value 506, so node 112 will not lock onto channel 2.

At some time, frequency hopping module 128 may cyclically return, via a frequency hop, to channel 1. At this time, channel 1 has a second transmission signal having a third signal strength 510. Node 112 may subsequently measure the third signal strength. Processing unit 122 may determine whether to lock onto the first channel based, at least in part, on whether the third signal strength 510 is greater than signal threshold value 506.

In some embodiments, explained below, processing unit 122 may apply signal threshold value 506 to the first channel and apply a different signal threshold value to other channels. In some embodiments, explained below, processing unit 122 may modify the signal threshold value 506 based, at least in part, on time elapsed since frequency hopping away from the first channel (e.g., a short time after time T1, but prior to time T2). Such modifying may be based on (i) distance (e.g., from node 112, as measured by positioning system 120) to a transmitter transmitting the first transmission signal, and/or (ii) type of the transmitter transmitting the first transmission signal.

In some embodiments, signal threshold value 506 may be bounded by a predetermined minimum value and/or a predetermined maximum value. For example, a maximum (e.g., ceiling) value may be set for signal threshold value 506 regardless of first signal strength 504. Similarly, a minimum (e.g., floor) value may be set for signal threshold value 506 regardless of first signal strength 504.

In some embodiments, signal threshold value 506 may be generated in consideration of presence or absence of neighboring channels. For example, if channel 2 is not detected during a channel hop process from channel 1 (e.g., hopping to channels other than channel 2), then signal threshold value 506 may be modified (e.g., either lowered or raised) based, at least in part, on the absence of channel 2. Similarly, if channel 2 is detected during a channel hop process from channel 1, after being undetected during earlier hops, then signal threshold value 506 may be modified (e.g., either lowered or raised) based, at least in part, on the presence of channel 2.

In some embodiments, signal threshold value 506 may be generated based, at least in part, on machine learning and training data. For example, such training data may be generated over relatively long time spans (e.g., several seconds, minutes, or longer) by recording presence of channels, their respective signal strength, frequency, signal quality, and so on. Generation or modification of signal threshold value 506 may be based, at least in part, on such information.

For example, in some implementations, machine learning may lead to adjusting a signal threshold value based, at least in part, on a distribution of measured or collected characteristics of channels scanned cyclically a relatively large number of times. Characteristics such as signal strength, frequency, signal quality, and so on, may be collected by a receiver and subsequently used as training data, which may itself be updated from time to time or periodically. Benefits of such machine learning include, for example, predicting signal strengths of channels so that a signal threshold value may be "optimally tuned" to a spectral distribution of frequencies during a particular time span.

Figure 6:
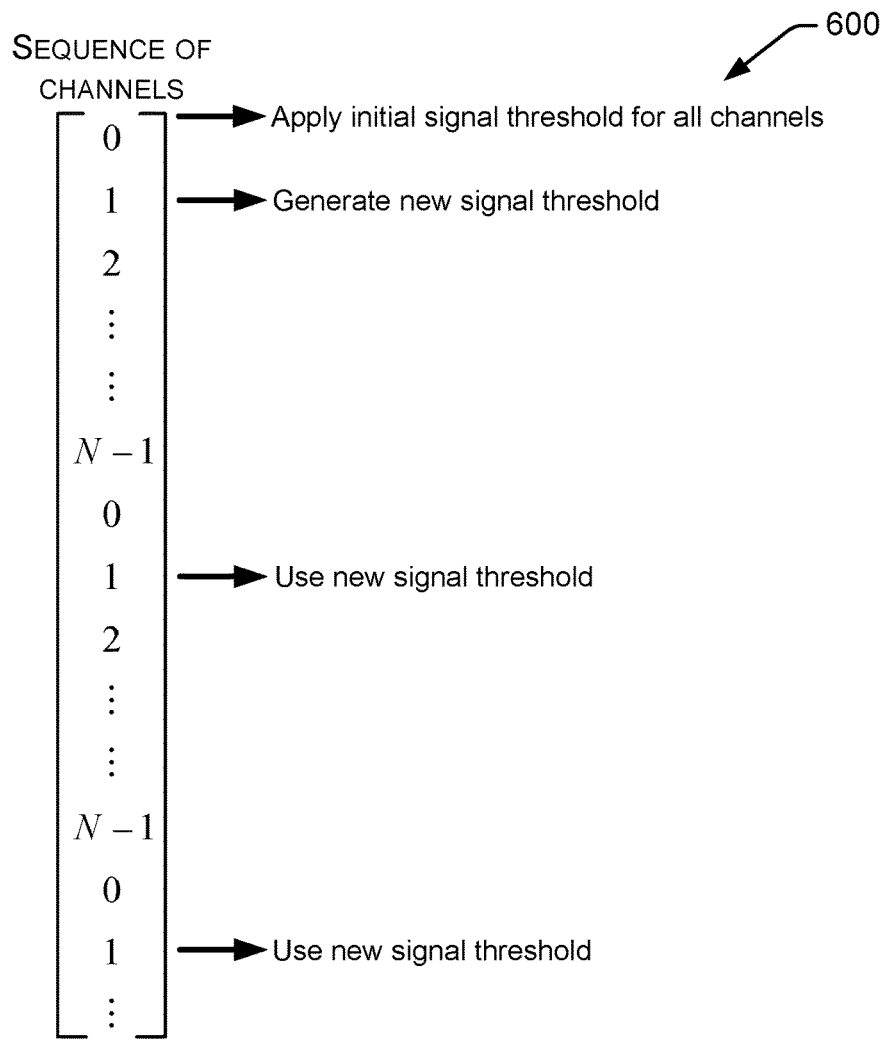
FIG. 6 is a schematic diagram illustrating an example process for frequency hopping among a sequence of channels.

FIG. 6 is a schematic diagram illustrating an example process 600 for frequency hopping among a sequence of channels. For example, a frequency hopping module, such as 128 of node 112 may perform such a process. Generally, a frequency hopping module may hop among N number of channels in a spectrum. In some examples, the sequence of hops need not be constant and may change over time. In the case illustrated in FIG. 6, however, the hop sequence is channel 0, 1, 2, . . . N−1, 0, 1, 2, . . . etc.

Node 112 may initially apply a predetermined signal threshold to all channels. Such an initial signal threshold may, for example, be set relatively near, but above, an expected RF noise floor (e.g., −100 dB). In the example of FIG. 6, channel 1 is the only channel among channels 0 to N−1 that has a relatively strong signal (e.g., −20 dB), which indicates that data packets are available to be received on channel 1, whereas all the other channels only include noise or signals too weak (e.g., less than −80 dB) to result in reliable data reception. Initially, node 112 hops to channel 0 and applies the initial signal threshold to determine whether to lock onto channel 0. The magnitude of the RF signal on channel 0, however, is less than that of the initial signal threshold so that node 112 does not lock onto channel 0 and moves on to channel 1 via a frequency jump. Upon or after hopping to channel 1, node 112 applies the initial signal threshold to determine whether to lock onto channel 1. Node 112 measures the magnitude of the RF signal on channel 1 and determines that the magnitude is greater than that of the initial signal threshold. Accordingly, node 112 locks onto channel 1. Consequently, node 112 (via radio 116, for example) receives a first set of data, which may be in the form of packets, on channel 1.

Before hopping from channel 1, node 112 generates a new signal threshold based, at least in part, on the magnitude of the RF signal on channel 1. Node 112 may generate the new signal threshold by any of number of techniques. For example, node 112 may set the new signal threshold to be a particular percentage of the magnitude of the RF signal on channel 1 (e.g., some 20%, 50%, 80%, etc.). For another example, node 112 may set the new signal threshold to be a particular percentage of the magnitude of the RF signal plus the value of the noise floor. For still another example, node 112 may set the new signal threshold based, at least in part, on the type or application of the transmitter and/or receiver. For instance, the application of the transmitter/receiver may be for communication between a control center and flying aircraft involving relatively large distances. In another instance, the application of the transmitter/receiver may be for communication between handheld devices involving relatively short distances. Such differences may lead to different rates of change of RF signal magnitude. This may have an effect where each subsequent lock onto a particular channel involves a relatively large or relatively small drop in RF signal magnitude. In the case of an expected relatively large drop in RF signal magnitude, the new signal threshold may be set to be lower than for the case of an expected relatively small drop in RF signal magnitude.

In some embodiments, node 112 will hop from channel 1 regardless of whether or not the data on channel 1 has been fully read. In other words, node 1 may hop from channel 1 after a predetermined amount of time regardless of the status of data reading. This makes sense in view of the fact that the data may, without a particular ending, be continuously streaming from a transmitter. In a frequency hopping system, a channel having data to be read will be cyclically locked onto so that communication between the transmitter and node 112 is substantially continuous.

Upon or after hopping to channel 2, node 112 applies the new signal threshold to determine whether to lock onto channel 2. Node 112 measures the magnitude of the RF signal on channel 2 and determines that the magnitude is less than that of the new signal threshold. Accordingly, node 112 does not lock onto channel 2 and subsequently hops to the next channel. This process repeats though all channels up to N−1 and returns to channel 0.

Upon or after hopping to channel 0, node 112 applies the new signal threshold to determine whether to lock onto channel 0. The magnitude of the RF signal on channel 0, however, is less than that of the new signal threshold so that node 112 does not lock onto channel 0 and moves on to channel 1 via a frequency jump. Upon or after hopping to channel 1, node 112 applies the new signal threshold to determine whether to lock onto channel 1. Node 112 measures the magnitude of the RF signal on channel 1 and determines that the magnitude is greater than that of the initial signal threshold. Accordingly, node 112 locks onto channel 1. Consequently, node 112 receives a second set of data on channel 1.

In some embodiments, before hopping from channel 1, node 112 may modify the new signal threshold based, at least in part, on the magnitude of the most recently measured RF signal on channel 1. Node 112 may modify the new signal threshold by any of number of techniques, as described above for example.

Upon or after hopping to channel 2, node 112 applies the new (or modified) signal threshold to determine whether to lock onto channel 2. Node 112 measures the magnitude of the RF signal on channel 2 and determines that the magnitude is less than that of the new signal threshold. Accordingly, node 112 does not lock onto channel 2 and subsequently hops to the next channel. This process repeats though all channels up to N−1 and returns to channel 0.

Figure 7:
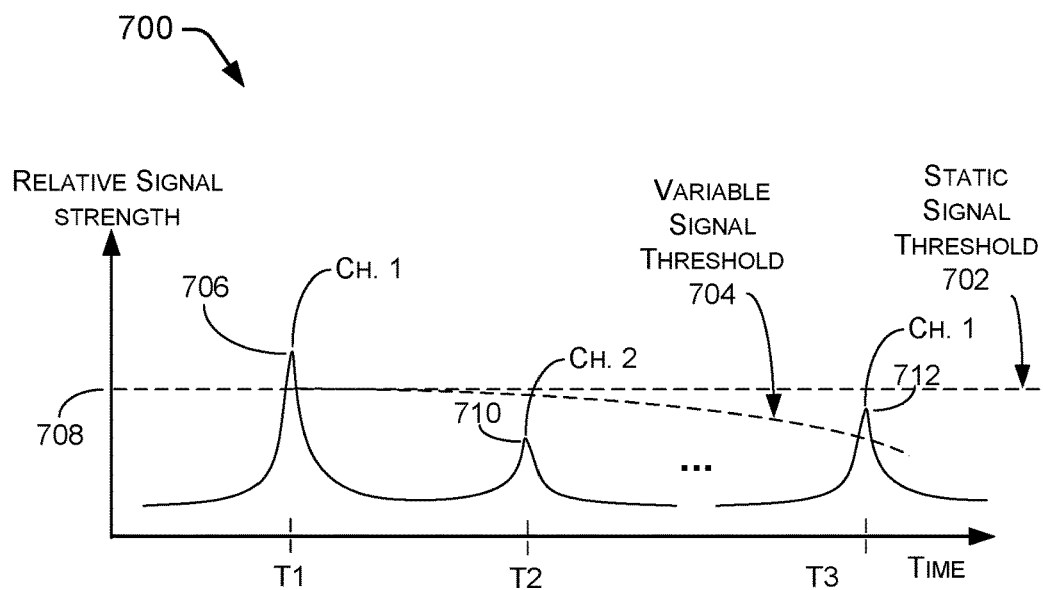
FIG. 7 illustrates an example scan over time across signals of two channels that are compared to a variable signal threshold that is associated with one of the channels.

FIG. 7 illustrates an example scan 700 over time across RF signals transmitted by an RF transmitter on two channels, wherein the RF signals are compared to a variable signal threshold that is associated with one of the channels. The situation of FIG. 7 is similar to that of FIG. 5 except that, among other things, the signal threshold is variable between frequency hops and not static. For instance, signal threshold 702 may be similar to or the same as signal threshold 502. As described above, signal threshold 502 may be maintained at a constant value or its value may be updated periodically or from time to time. Variable signal threshold 704, on the other hand, may constantly vary during frequency hops. Such variability, which may be time dependent, may follow a decaying exponential, a linear decrease, a stair step, or other type of change, just to name a few examples. Factors involved in the time dependency, such as one or more scalers or coefficients in an exponential equation, may be selected based, at least in part, on the type or application of the transmitter and/or receiver.

Static signal threshold 702 is included in the figure merely to compare with variable signal threshold 704, which is described in detail below.

As in the case for the example of FIG. 5, an RF receiver may scan across a spectrum and sequentially hop among individual channels. In the illustrated example of FIG. 7, the RF receiver intercepts and receives an RF signal of channel 1 at time T1, frequency hops to channel 2 at time T2, and then hops to other channels (not illustrated). At some time, the RF receiver may cyclically return to channel 1 via a frequency hop at time T3. The RF receiver may generate signal threshold 704 based, at least in part, on the RF signal of channel 1.

After receiving data on channel 1, the RF receiver may frequency hop to channel 2. Here, the RF receiver may determine whether to lock onto channel 2 or whether to ignore the RF signal of channel 2 and hop to a subsequent channel (not illustrated). As mentioned above, the criterion for determining whether to lock onto a channel is whether the RF signal associated with the channel has a magnitude greater than that of signal threshold 704. In the case illustrated in FIG. 7, the RF signal for channel 1 is above the signal threshold. Thus, the RF receiver may lock onto channel 1. The RF signal for channel 2, however, is below signal threshold 704. This is true even though signal threshold 704 has decreased from its initial value at time T1. Accordingly, the RF receiver may ignore channel 2 and frequency hop to a subsequent channel. Thus, the RF receiver has locked onto channel 1 to receive data on channel 1 and has not locked onto channel 2.

At time T3, the RF receiver will again cyclically frequency hop to channel 1. The RF signal of channel 1 at time T3, in the illustrated example, is less than that of the RF signal of channel 1 at time T1. Such a change in magnitude (e.g., weaker signal) may be due to an increased distance between the RF transmitter and the RF receiver, for example. Nevertheless, because the RF signal is greater than signal threshold 704, the RF receiver may lock onto channel 1 to further receive data from channel 1.

The process described above for scan 700 may be performed by an entity such as node 112, for example. In such a case, frequency hopping module 128 may frequency hop to channel 1, which has a first transmission signal having a first signal strength 706. Frequency hopping module 128 may measure first signal strength 706. Subsequently, processing unit 122 may generate an initial value 708 for signal threshold 704 based, at least in part, on first signal strength 706.

Frequency hopping module 128 may frequency hop away from channel 1 to channel 2 and determine whether to lock onto a second signal on channel 2. Such determining may be based, at least in part, on whether second signal strength 710 is greater than the value of signal threshold 704 at time T2. In the illustrated case, second signal strength 710 is less than the value of signal threshold 704 at time T2, so node 112 will not lock onto channel 2.

At some time, frequency hopping module 128 may cyclically return, via a frequency hop, to channel 1. At this time, channel 1 has a second transmission signal having a third signal strength 712. Node 112 may subsequently measure the third signal strength. Processing unit 122 may determine whether to lock onto the first channel based, at least in part, on whether the third signal strength 712 is greater than the value of signal threshold 704 at time T3. In the example illustrated in FIG. 7, the strength of the signal on channel 1 at time T3 is substantially less than that at time T1. This may be the case for any of a number of reasons, such as an increase in distance between the transmitter and receiver during the time span between times T1 and T3, signal interference that is greater at time T3 than for time T1, and so on. Even though the strength of the signal on channel 1 at time T3 is substantially less than that at time T1, the signal at time T3 nevertheless is greater than the value of signal threshold 704 at time T3, so node 112 will again lock onto channel 1.

Figure 8:
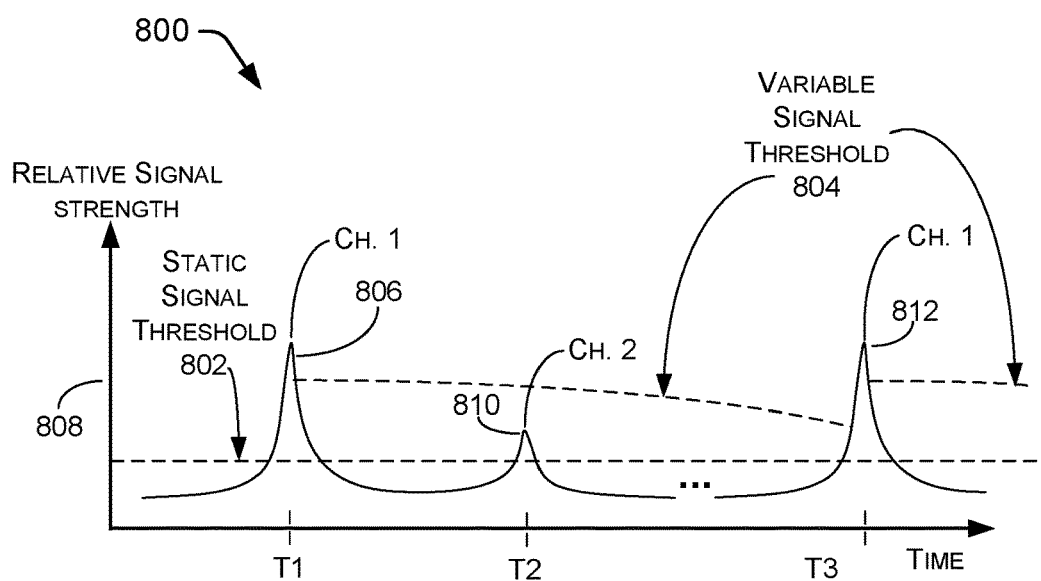
FIG. 8 illustrates another example scan over time across signals of two channels that are compared to a variable signal threshold that is associated with one of the channels.

FIG. 8 illustrates an example scan 800 over time across RF signals transmitted by an RF transmitter on channels 1 and 2, wherein the RF signals are compared to a predetermined static signal threshold 802 and a variable signal threshold 804 generated based, at least in part, on the RF signal of channel 1. The situation of FIG. 8 is similar to that of FIG. 7 where, among other things, the signal threshold is variable between frequency hops and not static. In contrast to FIG. 7, however, FIG. 8 illustrates a situation where adjacent channel 2 is ignored (e.g., not locked thereon) in view of variable signal threshold 804, but would have been locked onto in view of static signal threshold 802. Thus, in such a situation, the variable signal threshold allows for a receiver to ignore communications from an adjacent channel that otherwise would have been locked onto by the receiver.

As in the case illustrated in FIG. 7, variable signal threshold 804 may constantly vary during frequency hops. Such variability, which may be time dependent, may follow a decaying exponential, a linear decrease, a stair step, or other type of change, just to name a few examples. Factors involved in the time dependency, such as one or more scalers or coefficients in an exponential equation, may be selected based, at least in part, on the type or application of the transmitter and/or receiver.

As in the case for the example of FIG. 5, the RF receiver may scan across the spectrum and sequentially hop among the individual channels. In the illustrated example of FIG. 8, the RF receiver intercepts and receives an RF signal of channel 1 at time T1, frequency hops to channel 2 at time T2, and then hops to other channels (not illustrated). At some time, the RF receiver may cyclically return to channel 1 via a frequency hop at time T3. The RF receiver may generate signal threshold 804 based, at least in part, on the RF signal of channel 1. In contrast, static signal threshold 802, included in the figure merely to help explain how it contrasts with variable signal threshold 804, may be predetermined.

After receiving data on channel 1, the RF receiver may frequency hop to channel 2. Here, the RF receiver may determine whether to lock onto channel 2 or whether to ignore the RF signal of channel 2 and hop to a subsequent channel (not illustrated). As mentioned above, the criterion for determining whether to lock onto a channel is whether the RF signal associated with the channel has a magnitude greater than that of signal threshold 804. In the case illustrated in FIG. 8, the RF signal for channel 1 is above the signal threshold. Thus, the RF receiver may lock onto channel 1. The RF signal for channel 2, however, is below signal threshold 804. This is true even though signal threshold 804 has decreased from its initial value at time T1. Accordingly, the RF receiver may ignore channel 2 and frequency hop to a subsequent channel. Thus, the RF receiver has locked onto channel 1 to receive data on channel 1 and has not locked onto channel 2. In contrast, if static signal threshold 802 were considered instead of variable signal threshold 804, then the RF receiver would have (undesirably) locked onto channel 2.

At time T3, the RF receiver will again cyclically frequency hop to channel 1. The RF signal of channel 1 at time T3, in the illustrated example, is similar to that of the RF signal of channel 1 at time T1. Because the RF signal is greater than signal threshold 804, the RF receiver may again lock onto channel 1 to further receive data from channel 1. In the embodiment illustrated in FIG. 8, the receiver may reset variable signal threshold 804 to the initial value determined at time T1.

The process described above for scan 800 may be performed by an entity such as node 112, for example. In such a case, frequency hopping module 128 may frequency hop to channel 1, which has a first transmission signal having a first signal strength 806. Frequency hopping module 128 may measure first signal strength 806. Subsequently, processing unit 122 may generate an initial value 808 for signal threshold 804 based, at least in part, on first signal strength 806.

Frequency hopping module 128 may frequency hop away from channel 1 to channel 2 and determine whether to lock onto a second signal on channel 2. Such determining may be based, at least in part, on whether second signal strength 810 is greater than the value of signal threshold 804 at time T2. In the illustrated case, second signal strength 810 is less than the value of signal threshold 804 at time T2, so node 112 will not lock onto channel 2.

At some time, frequency hopping module 128 may cyclically return, via a frequency hop, to channel 1. At this time, channel 1 has a second transmission signal having a third signal strength 812, which may be the same as or different from first signal strength 806. Node 112 may subsequently measure the third signal strength. Processing unit 122 may determine whether to lock onto the first channel based, at least in part, on whether the third signal strength 812 is greater than the value of signal threshold 804 at time T3. In the example illustrated in FIG. 8, the strength of the signal on channel 1 at time T3 is substantially the same as that at time T1. Because the strength of the signal on channel 1 at time T3 is substantially the same as that at time T1, the signal at time T3 nevertheless is greater than the value of signal threshold 804 at time T3, so node 112 will again lock onto channel 1.

Figure 9:
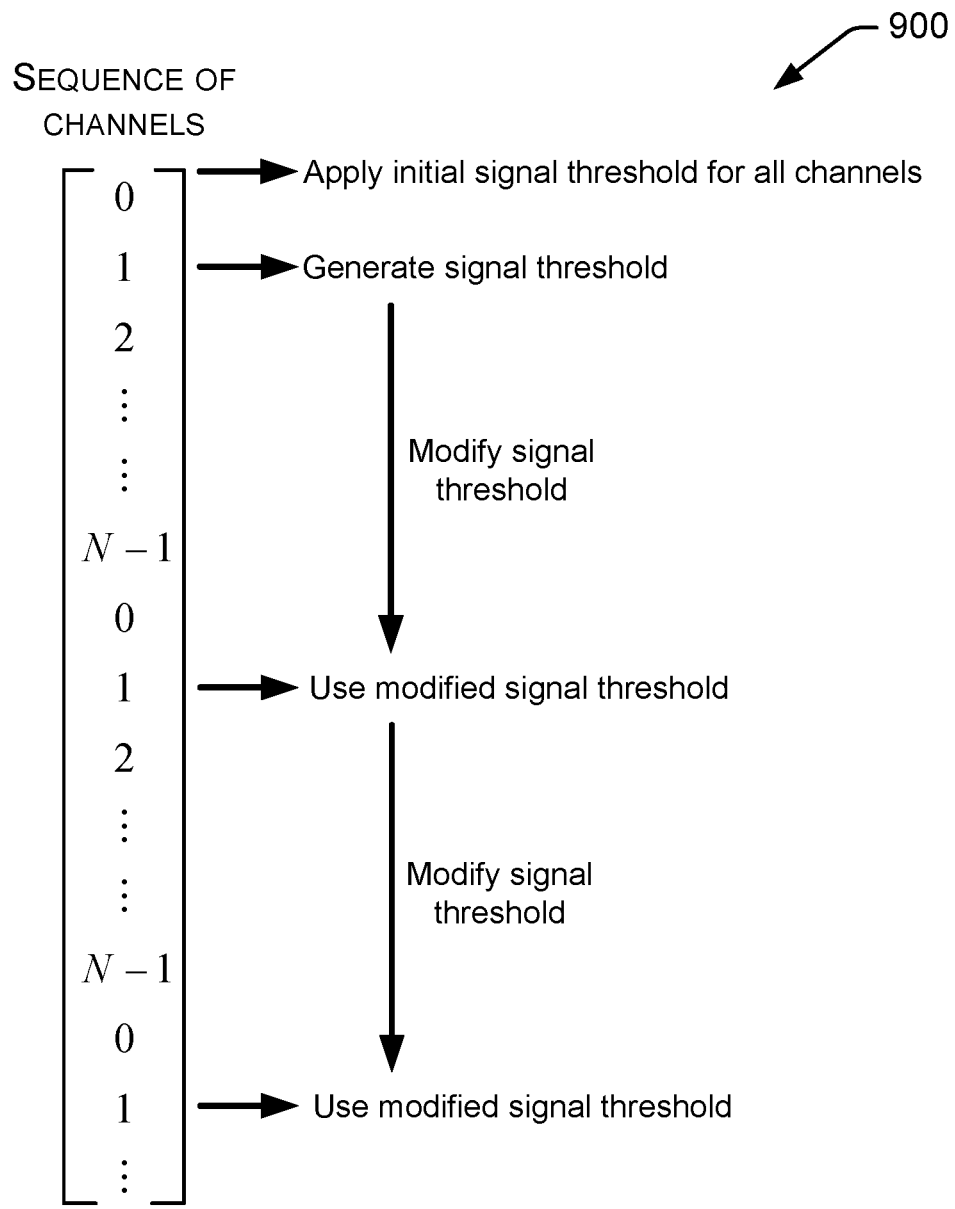
FIG. 9 is a schematic diagram illustrating an example process for frequency hopping among a sequence of channels and involving a variable signal threshold.

FIG. 9 is a schematic diagram illustrating an example process 900 for frequency hopping among a sequence of channels and involving a variable signal threshold. For example, a frequency hopping module, such as 128 of node 112 may perform such a process. As described above, a frequency hopping module may hop among N number of channels in a spectrum. In some examples, the sequence of hops need not be constant and may change over time. In the case illustrated in FIG. 6, however, the hop sequence is channel 0, 1, 2, . . . N−1, 0, 1, 2, . . . etc.

Node 112 may initially apply a predetermined signal threshold to all channels. Such an initial signal threshold may, for example, be set relatively near, but above, an expected RF noise floor (e.g., −100 dB). In the example of FIG. 9, channel 1 is the only channel among channels 0 to N−1 that has a relatively strong signal. Initially, node 112 hops to channel 0 and applies the initial signal threshold to determine whether to lock onto channel 0. The magnitude of the RF signal on channel 0, however, is less than that of the initial signal threshold so that node 112 does not lock onto channel 0 and moves on to channel 1 via a frequency jump. Upon or after hopping to channel 1, node 112 applies the initial signal threshold to determine whether to lock onto channel 1. Node 112 measures the magnitude of the RF signal on channel 1 and determines that the magnitude is greater than that of the initial signal threshold. Accordingly, node 112 locks onto channel 1. Consequently, node 112 (via radio 116, for example) receives a first set of data, which may be in the form of packets, on channel 1.

Before hopping from channel 1, node 112 generates a new time-variable signal threshold based, at least in part, on the magnitude of the RF signal on channel 1. Node 112 may generate the new time-variable signal threshold by any of number of techniques. For example, node 112 may set the initial value of the new signal threshold to be a particular percentage of the magnitude of the RF signal on channel 1 (e.g., some 20%, 50%, 80%, etc.). For another example, node 112 may set the initial value of the new signal threshold to be a particular percentage of the magnitude of the RF signal plus the value of the noise floor. For still another example, node 112 may set the initial value of the new signal threshold and/or factors (e.g., scalers, coefficients, quadratic exponents, and so on) of an equation that defines the new signal threshold based, at least in part, on the type or application of the transmitter and/or receiver. For instance, the application of the transmitter/receiver may for communication between a control center and flying aircraft involving relatively large distances. In another instance, the application of the transmitter/receiver may for communication between handheld devices involving relatively short distances. Such differences may lead to different rates of change of RF signal magnitude. This may have an effect where each subsequent lock onto a particular channel involves a relatively large or relatively small drop in RF signal magnitude. In the case of an expected relatively large drop in RF signal magnitude, the time-variable signal threshold may be set to have a faster decay than for the case of an expected relatively small drop in RF signal magnitude.

Upon or after hopping to channel 2, node 112 applies the new time-variable signal threshold to determine whether to lock onto channel 2. Node 112 measures the magnitude of the RF signal on channel 2 and determines that the magnitude is less than that of the new signal threshold. Accordingly, node 112 does not lock onto channel 2 and subsequently hops to the next channel. This process repeats though all channels up to N−1 and returns to channel 0.

Upon or after hopping to channel 0, node 112 applies the new time-variable signal threshold to determine whether to lock onto channel 0. The magnitude of the RF signal on channel 0, however, is less than that of the new time-variable signal threshold so that node 112 does not lock onto channel 0 and moves on to channel 1 via a frequency jump. Upon or after hopping to channel 1, node 112 applies the new time-variable signal threshold to determine whether to lock onto channel 1. Node 112 measures the magnitude of the RF signal on channel 1 and determines that the magnitude is greater than that of the initial signal threshold. Accordingly, node 112 locks onto channel 1. Consequently, node 112 receives a second set of data on channel 1.

In some embodiments, node 112 may modify the new time-variable signal threshold based, at least in part, on the magnitude of the most recently measured RF signal on a channel. Node 112 may modify the new time-variable signal threshold by changing the initial value of the signal threshold and/or changing factors (e.g., scalers, coefficients, quadratic exponents, and so on) of an equation that defines the time-variable signal threshold.

Upon or after hopping to channel 2, node 112 applies the new (or modified) time-variable signal threshold to determine whether to lock onto channel 2. Node 112 measures the magnitude of the RF signal on channel 2 and determines that the magnitude is less than that of the new signal threshold. Accordingly, node 112 does not lock onto channel 2 and subsequently hops to the next channel. This process repeats though all channels up to N−1 and returns to channel 0.

Figure 10:
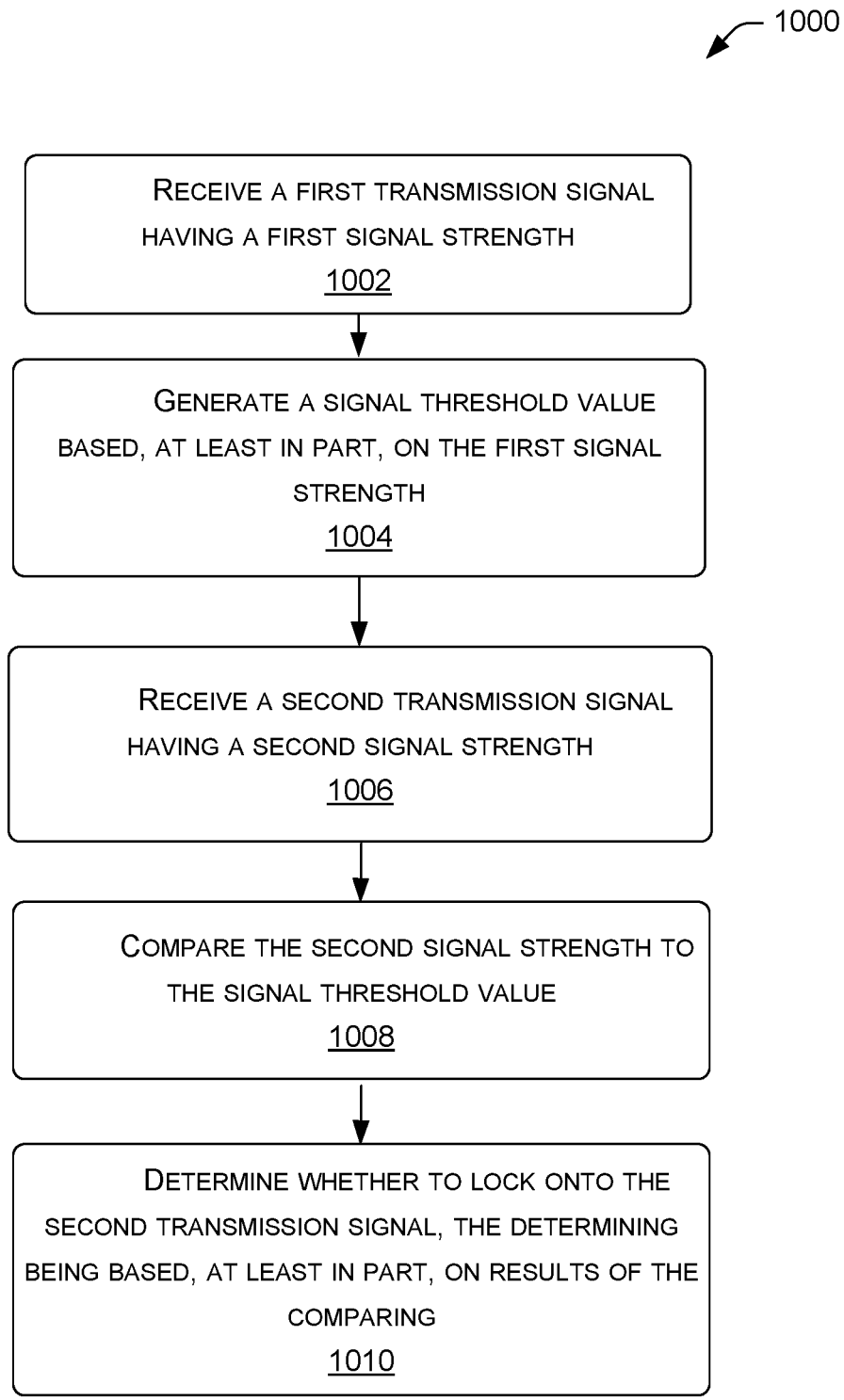
FIG. 10 is a flow diagram illustrating an example process of frequency hopping.

FIG. 10 is a flow diagram illustrating a process 1000 of frequency hopping, according to various embodiments. For example, such a process may be performed by node 112. At block 1002, node 112 receives a first transmission signal having a first signal strength. At block 1004, node 112 generates a signal threshold value based, at least in part, on the first signal strength. In some examples, the signal threshold value is time-dependent. At block 1006, node 112 receives a second transmission signal having a second signal strength. In some examples, a channel of the first transmission signal and a channel of the second transmission signal are the same as one another. At block 1008, node 112 compares the second signal strength to the signal threshold value. At block 1010, node 112 determines whether to lock onto the second transmission signal, the determining being based, at least in part, on results of the comparing. In some examples, node 112 may modify the noise threshold value based, at least in part, on location of a transmitter transmitting the second transmission signal. Such a location may be received by the node via wireless communication, for example or may be stored in memory 126. In some examples, node 112 may modify the noise threshold value based, at least in part, on type of a transmitter transmitting the second transmission signal. Such a transmitter type may be described by its size, power, operation parameters, and so on. In some examples, node 112 may update the signal threshold value based, at least in part, time elapsed since receiving the first transmission signal.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A method comprising:
   frequency hopping to a first channel having a first transmission signal, the first transmission signal having a first signal strength;
   measuring the first signal strength;
   locking onto the first channel;
   generating a noise threshold value based, at least in part, on the first signal strength;
   frequency hopping away from the first channel to one or more other channels;
   frequency hopping to the first channel having a second transmission signal, the second transmission signal having a second signal strength;
   measuring the second signal strength; and
   determining whether to lock onto the second transmission signal on the first channel, the determining based, at least in part, on whether the second signal strength is greater than the noise threshold value.

2. The method of claim 1, further comprising applying the noise threshold value to the first channel and applying a different noise threshold value to the one or more other channels.

3. The method of claim 1, further comprising decreasing the noise threshold value based, at least in part, on time elapsed since frequency hopping away from the first channel.

4. The method of claim 1, further comprising modifying the noise threshold value based, at least in part, on location of a transmitter transmitting the second transmission signal.

5. The method of claim 1, further comprising modifying the noise threshold value based, at least in part, on type of a transmitter transmitting the second transmission signal.

6. The method of claim 1, wherein the first transmission signal comprises a first set of data packets and the second transmission signal comprises a second set of data packets.

7. A method comprising:
   receiving a first transmission signal via a channel, the first transmission signal having a first signal strength;
   generating a signal threshold value based, at least in part, on the first signal strength;
   frequency hopping between the channel and one or more other channels;
   receiving a second transmission signal via the channel, the second transmission signal having a second signal strength; and
   determining whether to lock onto the second transmission signal based at least in part on the second signal strength being greater than the signal threshold value.

8. The method of claim 7, wherein the signal threshold value is time-dependent.

9. The method of claim 7, further comprising modifying the signal threshold value based, at least in part, on location of a transmitter transmitting the second transmission signal.

10. The method of claim 7, further comprising modifying the signal threshold value based, at least in part, on type of a transmitter transmitting the second transmission signal.

11. The method of claim 7, further comprising updating the signal threshold value based, at least in part, time elapsed since receiving the first transmission signal.

12. A node in a network, the node comprising:
    a processing unit; and
    a computer-readable medium storing instructions executable by the processing unit, wherein the instructions program the processing unit to:
    generate a first signal threshold by operations comprising:
      receiving a first signal on a first channel, the first signal having a first received signal strength indication (RSSI) value, and
      generating the first signal threshold for the first channel based, at least in part, on the first RSSI value; and
    determine, based at least in part on the first signal threshold, whether to lock onto the first channel during subsequent frequency hop operations based at least in part on a subsequent signal received on the first channel having an RSSI value greater than the first signal threshold, the subsequent frequency hop operations comprising frequency hopping between the first channel and one or more other channels.

13. The node of claim 12, wherein the instructions further program the processing unit to:
    modify the first signal threshold based, at least in part, on time elapsed since receiving the first signal.

14. The node of claim 12, wherein the instructions further program the processing unit to:
    modify the first signal threshold based, at least in part, on location or velocity, relative to the node, of a transmitter that transmitted the first signal.

15. The node of claim 12, wherein the instructions further program the processing unit to:
    generate a second signal threshold by operations comprising:
      receiving a second signal on a second channel, the second signal having a second RSSI value, and
      generating a second signal threshold for the second channel based, at least in part, on the second RSSI value; and
    determine whether to lock onto the second channel during the subsequent frequency hop operations, the determining based, at least in part, on the second signal threshold.

16. The node of claim 15, wherein the instructions further program the processing unit to:
    modify the first signal threshold using a first set of parameters; and
    modify the second signal threshold using a second set of parameters, wherein the first set of parameters is different from the second set of parameters.

17. The node of claim 16, wherein the first set of parameters includes a quality indicator of the first signal.

18. The node of claim 12, wherein the first signal threshold is greater than a noise floor of the first channel.

19. The node of claim 12, wherein the instructions further program the processing unit to:
    modify the first signal threshold based, at least in part, on machine learning training data based, at least in part, on previous frequency hop operations.

20. The method of claim 7, further comprising:
    modifying the signal threshold value using a set of parameters.

* * * * *